March 5, 1968     P. S. PETERS     3,371,595

ENGLISH MUFFIN TOASTER

Filed May 27, 1966

United States Patent Office 3,371,595
Patented Mar. 5, 1968

3,371,595
ENGLISH MUFFIN TOASTER
Peter S. Peters, Milton, Mass., assignor to Interstate Fabrications, Inc., Dorchester, Mass., a corporation of Massachusetts
Filed May 27, 1966, Ser. No. 553,563
10 Claims. (Cl. 99—352)

ABSTRACT OF THE DISCLOSURE

A continuous toaster for the severed sides of English muffin halves having a variable preheat cycle and a toasting cycle. Transfer means are provided to deliver the English muffin halves from the variable preheat cycle in the proper attitude to expose the severed sides of the English muffin halves to the toasting cycle.

---

This invention relates to a toaster for English muffins and in particular to a toaster for the severed side of English muffin halves.

In the preparation of toasted English muffins for restaurant customers the practice heretofore has been to cut or tear the muffin in half and toast the severed sides on a grill. It is not practical to toast English muffin halves in conventional moving-belt restaurant toasters designed for sliced loaf bread because of the greater thickness of English muffin halves, the greater density of English muffins, and the preference of restaurant customers for having English muffin halves toasted on the severed side only. Batch toasting of English muffin halves on a grill has the disadvantage of requiring constant attention to prevent overcooking or burning.

It is an object of this invention to provide a toaster for English muffin halves.

It is another object of this invention to provide a toaster for the severed sides of English muffin halves which requires a minimum amount of attention.

It is a further object of this invention to provide a toaster for English muffins which will deliver a uniform product regardless of the temperature of the English muffins before toasting.

It is yet another object of this invention to provide an automatic toaster for English muffin halves which will deliver toasted English muffin halves on a continuous basis.

This invention accomplishes these objects by constructing a housing containing an extended heat source with conveying means disposed adjacent to the extended heat source. For example, in the preferred embodiment of the invention, there is provided conveyors above and below the extended heat source. To achieve adequate preheating necessary for a palatable end product, the untoasted English muffin halves are placed severed side down on the upper conveyor. The upper conveyor is open on top so that the English muffin halves may be placed so as to vary the length of their passage over the heat source according to their initial temperature and condition. For example, frozen halves would require the maximum length passage along the upper conveyor, refrigerated halves require a shorter length passage, and room temperature halves require the shortest length passage over the heat source to achieve adequate preheating. The preheated English muffin halves are caused to descend to the lower conveyor in a severed side up position. The English muffin halves then pass under the extended heat source where the severed side of the halves are toasted with radiant heat. At the end of this passage the toasted English muffin halves are delivered to a tray or holding bin.

Figure 1:
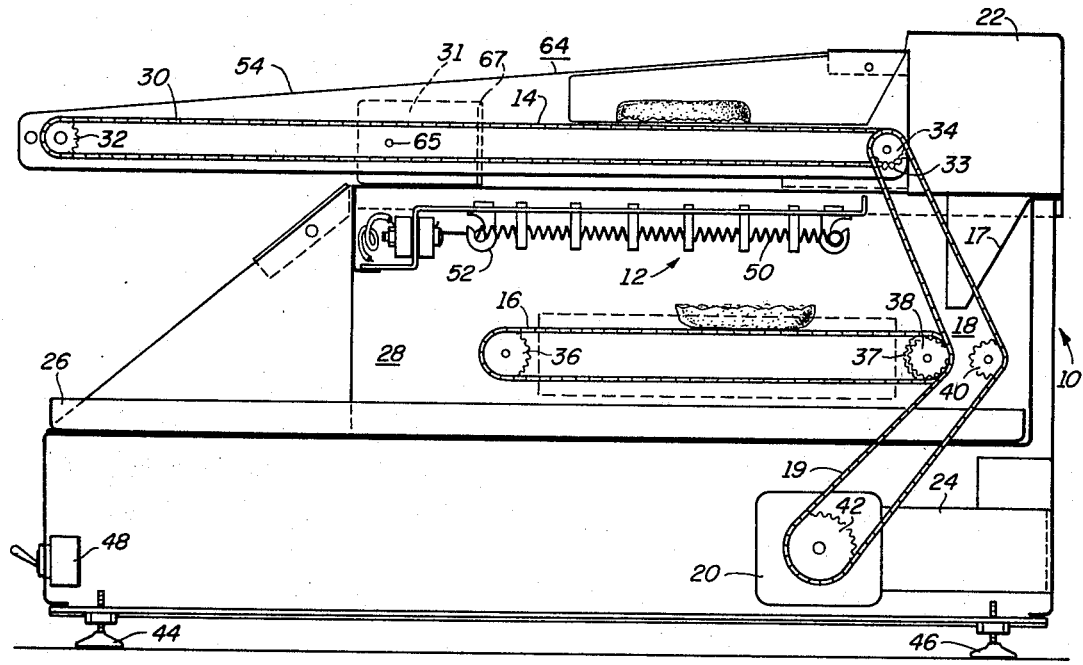
Figure 2:
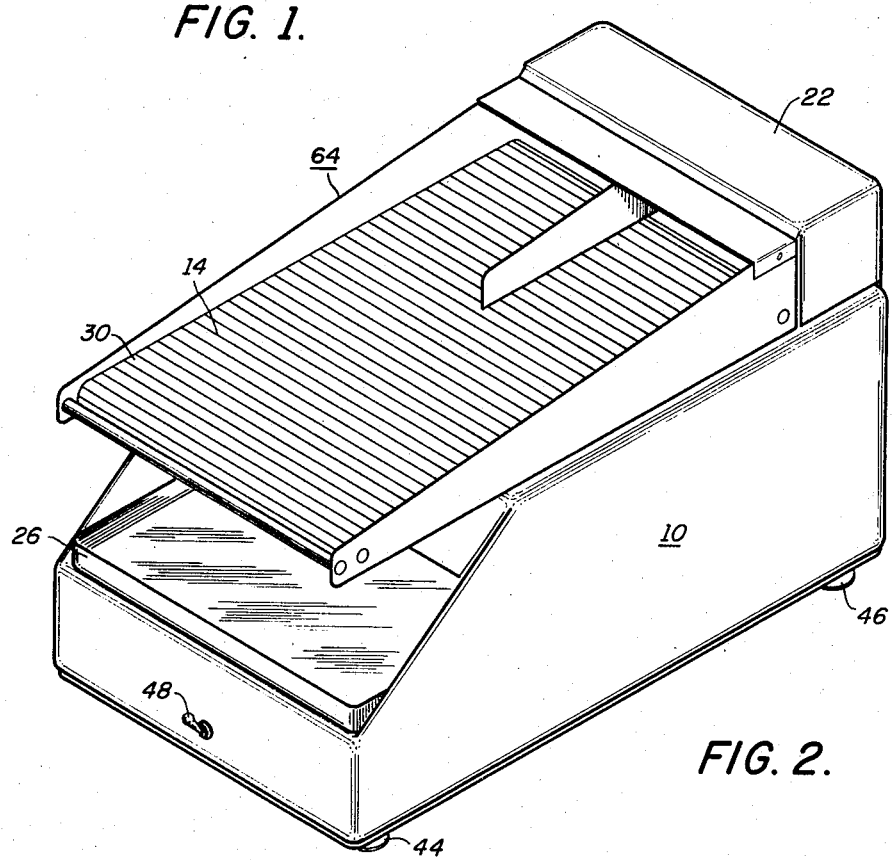

For a better understanding of the invention, reference may be had to the accompanying drawings in which:

FIGURE 1 is a longitudinal section through the embodiment of the invention shown in FIG. 2; and
FIGURE 2 is a perspective view of the embodiment of the invention shown in FIG. 1.

Referring to FIGS. 1 and 2, where like numerals refer to like parts, there is illustrated an embodiment of the invention.

There is provided a main housing 10, preferably of stainless steel for ease of maintenance and eye appeal, containing a horizontal extended heat source 12.

The heat source 12 illustrated is an electric one constructed of electrical insulators such as 52 which support a grid of nickel-chrome resistance wires such as wire 50. It will be understood that the heat source could also be of another type such as radiant gas burners.

A conveyor 14 is placed above the extended heat source 12 and a conveyor 16 below the extended heat source 12. Each of these conveyors may be constructed as an endless belt of a plurality of spaced-apart, linked slats 30. The slats 30 should be of a material that is heat resistant and non-toxic. Stainless steel is found desirable for this purpose.

The upper conveyor 14 extends substantially the entire length of an open tray 64 on the top of housing 10. The right end of the conveyor 14 is supported by two-link belt sprockets such as sprocket 33 and is driven by a diamond sprocket 34. The lower conveyor 16 is likewise supported by link belt sprockets such as sprockets 36 and 37 and driven by diamond sprocket 38. The diamond sprockets 34 and 38 are driven by a common drive means 18 which includes at least one roller chain 19, one or more idler sprockets 40, and a suitable reduction motor 20 with an attached diamond sprocket 42. The reduction motor may be mounted on an adjustable bracket 24 to provide a means to adjust the tension of roller chain 19. A chute 17 is provided to conduct English muffin halves from the upper conveyor 14 to the lower conveyor 16. The chute 17 is designed to turn the English muffin halves over as it conducts them to the lower conveyor 16. As the muffin halves fall off upper conveyor 14, they strike chute 17, which is set at an angle to force the muffin halves to land on lower conveyor 16 severed side up. A heat damper box 22 at the upper right hand corner of housing 10 provides means for controlling the temperature in housing 10, by permitting the escape of the desired amount of heated air. Damper box 22 is mounted on a vertical track, not shown, which permits damper box 22 to be moved upward to any of several positions to permit the escape of heated air from housing 10 by damper action.

Because this English muffin toaster is intended for counter top use, adjustable feet are provided, such as feet 44 and 46, to permit levelling of the machine on a sloping counter. A slide-out crumb tray 26 is desirable to catch crumbs falling through the conveyors 14 and 16. A holding area 28 is provided to receive the toasted English muffin halves as they fall off the left end of the lower conveyor 16.

A simple on and off switch 48 is provided near the front of the housing 10. This invention obviates the need for a variable heat control, as will be shown later.

English muffins are a yeast bread product characterized by a density greater than rolls or loaf bread. They are usually at least partially cooked before delivery to the user. In restaurant usage they may be stored in a freezer, refrigerator of at room temperature. At times, it may be desired to toast muffins of different initial temperatures. The present restaurant practice is to cut or tear the muffis in half and to grill the severed sides of the muffin halves on a hot surface. This practice has the disadvantage of high labor costs and non-uniformity of end product. For example, if the usual serving is three muffin halves and one of them is frozen at the start and the other two are at room temperature, unless great care is exercised by the counterman, two halves will be toasted to a greater degree than the third half.

The amount of moisture in the muffin also has a bearing on the time required to grill or toast the muffins. Muffins which have been out of the package for some time become dry and toast quickly. It is objectionable to the diner to have the severed sides of the muffin halves brown but to have the rest of the muffin undercooked or cold.

This invention solves three problems by providing a preheat or tempering cycle which brings all the muffin halves to a uniform temperature before the toasting cycle.

In operation, when the switch 48 is turned on, the extended heat source 12 is energized and the conveyors 14 and 16 move continuously at a slow rate. The top flight of conveyor 14, as seen in FIG. 1, moves from left to right; the top flight of conveyor 16 moves from right to left. The counter attendant places English muffin halves severed side down on conveyor 14. The substantially open top 54 of tray 64 permits the placement of the muffin halves at the desired point along conveyor 14 so that colder muffin halves will have a longer preheating travel than warmer or dry muffin halves.

The heat for the preheating is largely radiant heat from the top of housing 10, although there is some heating by convention. A leg 31 is provided which can be used to vary the distance between the housing 10 and the conveyor 14. Leg 31 is provided with a pivot 65 and a base 67. Leg 31 may be swung about pivot 65 so that leg base 67 is in complete contact with the top of housing 10. In this manner the operator has an additional way to vary the degree of preheating of the English muffin halves. When the leg 31 is used, the muffin halves on conveyor 14 receive less preheating because they are further from the top of housing 10 and hence from the heat source 12.

As the English muffin halves, such as 11 and 13, move slowly along the top flight of conveyor 14 they become warm all the way through before they reach chute 17. The temperature is not great enough on this pass to toast the severed side of the English muffin halves. As the English muffin halves drop off the right end of conveyor 14, they contact the chute 17 which is the transfer means to lower conveyor 16. The chute 17 turns the English muffin halves over so that they land on the right hand side of the top flight of conveyor 16 severed side up. Thus, it is seen how muffin halves which were severed side down on upper conveyor 14 are turned by chute 17 to land severed side up on lower conveyor 16. The conveyor 16 moves the English muffin halves slowly from right to left under the extended heat source 12. It is here that the severed sides of the English muffin halves become toasted by radiant heat.

The speeds of the upper and lower conveyors 14 and 16 may be adjusted by changing sprocket sizes to achieve the desired degree of muffin heating and toasting, Alternatively, the speeds of the upper and lower conveyors may be adjusted by changing the speed of the drive motor 20.

It will be understood that the English muffin halves will be rapidly toasted during their passage on lower conveyor 16 because of the heating and drying they have undergone during their passage on the upper conveyor 14.

The toasted English muffin halves fall off the left end of the lower conveyor 16 into a holding zone 28. The holding zone is warm, therefore, the toasted English muffin halves may remain there for some time before being served.

It can be seen from FIGS. 1 and 2 that there has been provided a special purpose toaster for English muffin halves which heats the English muffin halves all the way through and then toasts the severed sides of the English muffin halves.

The invention will turn out a uniform product regardless of the temperature or degree of dryness of the English muffin halves before toasting.

It will, therefore, be apparent that there has been disclosed a toaster for English muffin halves which fills a need that has been neglected by the automatic commercial toasters of the prior art.

Since numerous changes may be made in the above described apparatus and different embodiments of the invention may be made without departing from the spirit and scope thereof, it is intended that all matter contained in the foregoing description and shown in the accompanying drawings shall be interpreted as illustrative and not in a limiting sense.

What is claimed is:

1. A toaster for the severed side of English muffin halves, comprising in combination:
   (a) a housing;
   (b) a heat source disposed in said housing;
   (c) conveying means adjacent to said heat source to take said English muffin halves twice past said heat source, first to preheat the English muffin halves and then to toast the severed sides of said English muffin halves;
   (d) means to regulate the temperature in said housing; and
   (e) means to collect English muffin halves after toasting.

2. A toaster for the severed sides of English muffin halves, comprising in combination:
   (a) a housing;
   (b) an extended radiant heat source disposed in said housing;
   (c) a first conveying means disposed on one side of said extended heat source to preheat said English muffin halves by conveying them near said extended heat source;
   (d) a second conveying means disposed on the other side of said extended radiant heat source to toast the severed sides of said English muffin halves by conveying them near said extended radiant heat source;
   (e) transfer means located between said first and second conveying means to move the preheated English muffin halves from said conveying means to said second conveying means;
   (f) temperature control means to adjust the temperature in said housing to the desired level; and
   (g) drive means for said first and second conveying means.

3. The English muffin toaster of claim 2 wherein the extended radiant heat source is comprised of a network of electrical resistance wires.

4. The English muffin toaster of claim 2 wherein the first and second conveying means are each comprised of a plurality of spaced-apart, linked slats.

5. The English muffin toaster of claim 2 wherein the transfer means is arranged to deliver English muffin halves placed severed side down on the first conveying means to a severed side up position on said second conveying means.

6. The English muffin toaster of claim 2 wherein said housing has a substantially open top to allow placement of English muffin halves at the desired point along said first conveyor for optimum preheating.

7. The English muffin toaster of claim 2 wherein said transfer means is a chute which turns the English muffin halves over as it moves them from the first to the second conveying means.

8. The English muffin toaster of claim 2 wherein the temperature control means is a damper located at the top of said housing to permit the escape of the desired amount of heat from said housing.

9. The English muffin toaster of claim 2 wherein the drive means for said first and second conveying means comprises a reduction motor coupled to said first and second conveying means.

10. The English muffin toaster of claim 2 wherein means are provided to vary the distance between said first conveyor and said heat source.

References Cited

UNITED STATES PATENTS

| | | | |
|---|---|---|---|
| 1,473,213 | 11/1923 | De Matteis | 99—386 X |
| 1,776,501 | 9/1930 | Grady | 99—339 |
| 1,828,542 | 10/1931 | Padelford | 99—386 X |
| 2,032,272 | 2/1936 | Feltman | 99—386 |
| 2,112,309 | 3/1938 | Santillan | 99—339 |
| 2,225,068 | 12/1940 | Marriott | 99—386 X |
| 2,529,253 | 11/1950 | Hoffman et al. | 99—386 |
| 3,087,418 | 4/1963 | Albright | 99—400 X |
| 3,225,716 | 12/1965 | Kross et al. | 99—423 X |
| 3,273,489 | 9/1966 | Wilson | 99—339 X |

BILLY J. WILHITE, *Primary Examiner.*